United States Patent
Neumaier et al.

(10) Patent No.: US 9,211,619 B2
(45) Date of Patent: Dec. 15, 2015

(54) METHOD AND MACHINE TOOL FOR MACHINING A WORKPIECE

(75) Inventors: Josef Neumaier, Pfronten (DE); Thomas Lochbihler, Vils (AT); Uwe-Carsten Hansen, Eisenberg (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 1177 days.

(21) Appl. No.: 12/828,911

(22) Filed: Jul. 1, 2010

(65) Prior Publication Data
US 2011/0008119 A1 Jan. 13, 2011

(30) Foreign Application Priority Data
Jul. 3, 2009 (DE) .......................... 10 2009 027 463

(51) Int. Cl.
*B23Q 3/157* (2006.01)
*B23Q 7/04* (2006.01)
(Continued)

(52) U.S. Cl.
CPC ............ *B23Q 3/15506* (2013.01); *B23B 31/00* (2013.01); *B23F 17/00* (2013.01); *B23F 17/008* (2013.01); *B23F 23/006* (2013.01); *B23F 23/04* (2013.01); *B23Q 3/15713* (2013.01); *B23Q 7/045* (2013.01); *B23Q 7/046* (2013.01); *B23Q 7/047* (2013.01); *B23Q 37/002* (2013.01); *B23B 2260/07* (2013.01); *B23F 9/10* (2013.01); *Y10T 29/5114* (2015.01); *Y10T 409/100954* (2015.01); *Y10T 409/103975* (2015.01); *Y10T 409/30112* (2015.01); *Y10T 409/303248* (2015.01); *Y10T 409/306048* (2015.01); *Y10T 409/307448* (2015.01); *Y10T 483/10* (2015.01);
(Continued)

(58) Field of Classification Search
CPC ..................................................... B23Q 37/002
USPC ............ 483/14, 16, 18, 20, 1; 29/27 A, 27 R, 29/27 C, 560; 82/1.11
See application file for complete search history.

(56) References Cited

U.S. PATENT DOCUMENTS

| 4,644,635 A | 2/1987 | Murai et al. |
| 4,947,538 A * | 8/1990 | McMurtry ...................... 483/14 |

(Continued)

FOREIGN PATENT DOCUMENTS

| CN | 1597245 A | 3/2005 |
| CN | 201120503 Y | 9/2008 |

(Continued)

OTHER PUBLICATIONS

Machine Translation of JP 2003-300115-A, which JP '115 was published Oct. 2003.*

(Continued)

*Primary Examiner* — Erica E Cadugan
(74) *Attorney, Agent, or Firm* — Oliff PLC

(57) ABSTRACT

Embodiments of the present invention relate to a method and machine tool for machining a workpiece on the machine tool comprising at least 5 axes with a tool by using an NC program, the machine tool comprising a clamp for clamping a workpiece and a work spindle including a tool holder for holding a workpiece. The workpiece is clamped on the tool holder of the work spindle of the machine tool, the tool is clamped in the clamp of the machine tool, and the workpiece clamped in the tool holder of the work spindle is controlled in a program-controlled manner in relation to the tool clamped in the clamp for removing material from the workpiece.

4 Claims, 1 Drawing Sheet

(51) Int. Cl.
   *B23F 9/10* (2006.01)
   *B23F 17/00* (2006.01)
   *B23F 23/04* (2006.01)
   *B23Q 3/155* (2006.01)
   *B23Q 37/00* (2006.01)
   *B23B 31/00* (2006.01)
   *B23F 23/00* (2006.01)

(52) U.S. Cl.
   CPC ............ *Y10T 483/16* (2015.01); *Y10T 483/17* (2015.01); *Y10T 483/1705* (2015.01)

(56) References Cited

U.S. PATENT DOCUMENTS

| | | | |
|---|---|---|---|
| 6,832,433 B2 * | 12/2004 | Kramer | 29/558 |
| 6,904,652 B2 * | 6/2005 | Geissler et al. | 29/27 C |
| 2005/0065005 A1 | 3/2005 | Totsuka et al. | |
| 2007/0182103 A1 | 8/2007 | Okada et al. | |

FOREIGN PATENT DOCUMENTS

| | | |
|---|---|---|
| DE | 101 45 672 A1 | 3/2003 |
| DE | 20 2006 002 878 U1 | 5/2006 |
| DE | 100 29 967 B4 | 8/2006 |
| DE | 10 2007 031 703 A1 | 1/2009 |
| JP | 09-029574 A * | 2/1997 |
| JP | 2003-300115 A * | 10/2003 |
| JP | 2004-042152 A * | 2/2004 |
| JP | A-2005-177948 | 7/2005 |

OTHER PUBLICATIONS

Human Translation of JP 2003-300115-A, which JP '115 was published Oct. 21, 2003.*

Merriam-Webster's Collegiate Dictionary, 10$^{th}$ ed., the dictionary definition of "spindle", bottom portion of p. 1132 through top portion of p. 1133.*

English Translation of Mar. 25, 2014 Notice of Reasons for Refusal issued in Japanese Patent Application No. 2010-152185.

Summary of Dec. 27, 2013 Office Action issued in Chinese Patent Application No. 201010230924.2.

* cited by examiner

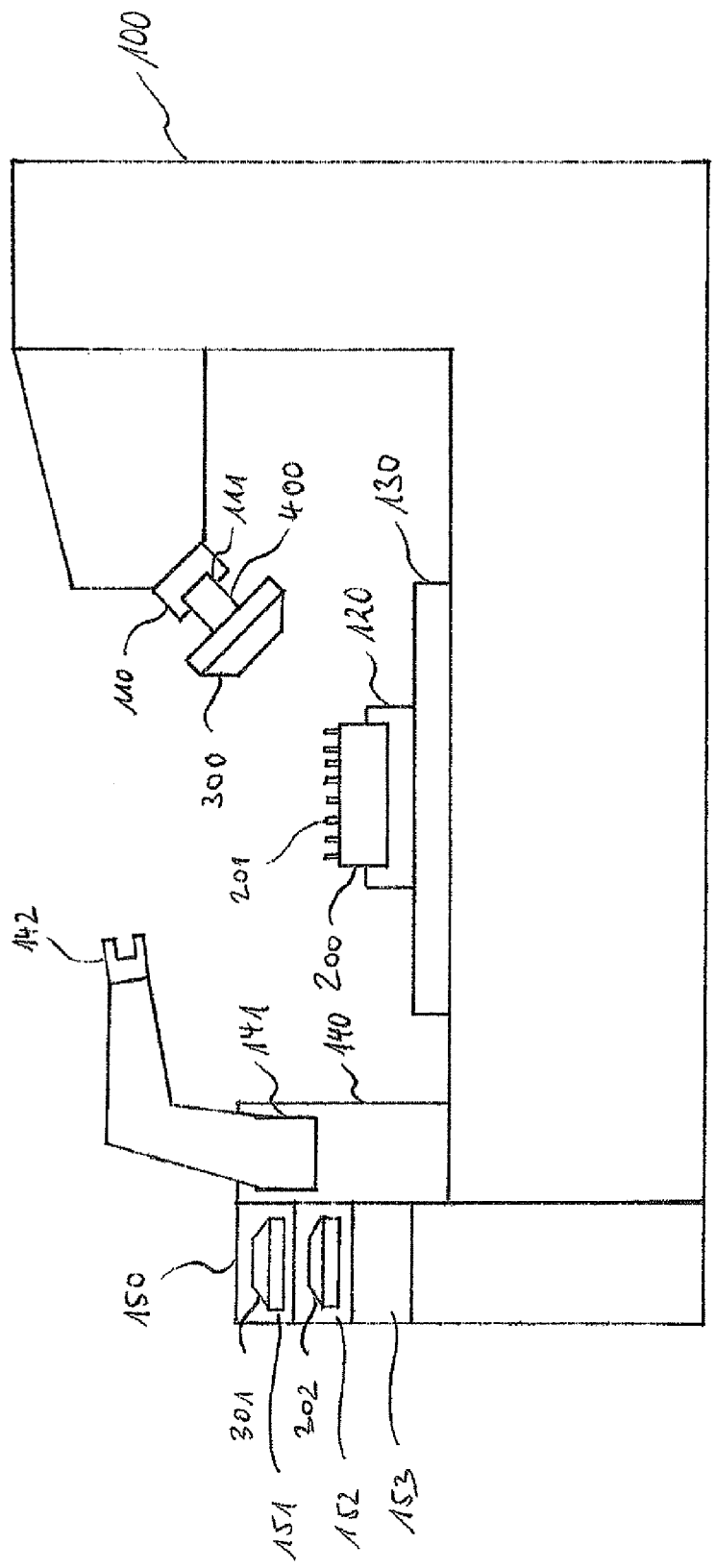

METHOD AND MACHINE TOOL FOR MACHINING A WORKPIECE

The present invention relates to a method and a machine tool, in particular to a universal milling machine or a machining center, for machining a workpiece under program control on a machine tool comprising at least 5 axes with a tool, the machine tool comprising a clamping means for clamping a workplace and a work spindle having a tool holding means for holding a tool, in particular a tool holding means for holding a tool taper, such as, for example, a Morse taper, steep-angle taper or hollow shank taper.

In particular, the present invention relates to a method and a machine tool for machining a workplace in a program-controlled manner by using a tool controlled by means of control data and an NC program, respectively, the machine tool comprising at least 5 simultaneously drivable axes, a clamping means for clamping the workpiece and a controller including a work spindle having a tool holding means for holding a tool, wherein the controller of the machine tool in particular is suitable for controlling the tool held in the tool holding means by using the control data along a tool track for removing material from the workplace clamped in the clamping means.

In particular, the present invention relates to methods for machining a workpiece on a machine tool and an adequate machine tool that is suitable for machining a workplace by milling and/or drilling using a milling or drilling tool that is clamped or held in the work spindle or main spindle of the machine tool in a tool holding means. In particular, the present invention relates, for example, to 5-axes milling machines, 5-axes milling/drilling machine tools, 5-axes milling/turning machine tools and universal milling machines and machining centers having 5 or more simultaneously drivable axes. The drive of the work or main spindle in such machine tools, which are relating to the invention, is provided for rotatively driving the tool so that the cutting movement is performed by driving the tool. Machine tools, which are relating to the invention, are to be distinguished from conventional lathes.

BACKGROUND OF THE INVENTION

In the prior art, CNC-controlled machine tools are well known that comprise at least 5 axes which make it possible to move or control a tool in 5 degrees of freedom through space in relation to a workpiece to be machined for removing material from the workpiece. CNC ("computerized numerical control") means that the machine tool is numerically controlled, for example, by using an NC program or CNC program.

The 5 degrees of freedom comprise the at least three spatial direction degrees of freedom (conventionally, mostly three orthogonally drivable spatial direction degrees of freedom, optionally referred to as an X axis, Y axis and Z axis) which may be driven by at least three linear axes, and at least two angular or rotational degrees of freedom which enable any tool orientation in relation to the workpiece. The angular or rotational degrees of freedom may be driven by two, three or more rotational axes of the machine tool (optionally referred to as A axis, B axis and C axis). Today's CNC machine tools comprising at least 5 axes in particular make it possible to simultaneously drive the 5 degrees of freedom whereby particularly complex and efficient tool paths in relation to a clamped workpiece are enabled. Furthermore, the prior art discloses machine tools having 6 axes on which 3 linear axes and 3 rotational axes may be simultaneously driven. Machine tools comprising more than 6 axes are also possible.

The machine tools disclosed by the prior art are suited to be equipped with a tool, such as, for example, a milling or drilling tool, that removes material from the workpiece by machining. Here, the tool is controlled by a controller by using an NC program or CNC program. Thus, a precise program-controlled machining of a workpiece clamped in the machine tool by using control data becomes possible.

For rotatively driving the tool, in particular for generating a cutting movement when the workpiece is machined by the tool, machine tools known from the prior art comprise a work spindle or main spindle including a work or main spindle drive that comprises a tool holding means for holding a tool. The tool holder on the work spindle is suitable for holding tools, in particular tool interfaces, such as, for example, tool tapers. Known tool tapers are e.g. Morse tapers, steep angle tapers or also hollow shank tapers. The workpiece to be machined is clamped on a clamping means of the machine tool, in particular on a clamping means on a turntable or rotary table of the machine tool that may be rotatively driven via a rotational axis for rotatively aligning the workpiece. The turntable or rotary table may for example be further configured to be pivotably driven by means of a pivoting axis (pivoting rotary table)

Furthermore, the above-described machine tools, such as, for example, universal milling machines or other machine tools comprising a tool changer are optionally adapted to perform an automatic program-controlled tool change on the work spindle by replacing the tool clamped on the work spindle of the machine tool or the tool held on the tool holding means of the work spindle with another tool. To this end, the machine tools comprise a tool changer that is adapted to automatically replace the tool clamped on the work spindle. Moreover, the machine tool may comprise a tool magazine for storing a plurality of tools, the tool changer replacing the tool clamped on the work spindle with a tool previously stored in the tool magazine during a tool change.

According to the operating mode of a tool changer disclosed by the prior art, the tool change is performed from the tool holding means of the work spindle into the magazine or vice versa, for example, in that a gripper or gripper device, in particular a simple or double gripper device of the tool changer, grips or holds the tools or tool tapers in which the tools are held. Such tool tapers (for reception in tool holders, for example, Morse tapers, steep angle tapers, hollow shank tapers) form a standardized interface between the tool holding means of the work spindle and the tool and allow a fast change of tools with a small tool change-over time. Furthermore, the prior art discloses so-called pick-up tool changing devices or pick-up tool changers which are suitable for directly inserting or replacing a tool from the tool holding means of the work spindle into the tool magazine or vice versa.

When machining workpieces on a machine tool in accordance with the methods known from the prior art, in particular on a milling/drilling machine tool, a drilling/milling machine tool, universal milling machines or a universal machining center, a workpiece to be machined is clamped on a clamping means of the machine tool, for example, on the turntable or rotary table of the machine tool that can be rotatively driven by means of a rotational axis and/or pivotably driven by means of a pivoting axis (e.g. a pivoting rotary table) and may also optionally be moved by means of one or more linear axes, or on an NC indexing head, and furthermore a tool provided for the machining is clamped on the work spindle of the machine tool. If it is required to use different tools for the machining of a workpiece, an automatic tool change may be performed on the work spindle.

It is an object of the present invention to provide a method for machining a workpiece on a machine tool comprising at least 5 axes and including a work spindle having a tool holding means and an adequate machine tool for machining a workpiece that enables more efficient and time-saving machining of workpieces on a machine tool including a work spindle having a tool holding means in contrast to the methods disclosed by the prior art.

It is another object of the present invention to provide a more efficient and time-saving method for machining a workpiece on a machine tool including a work spindle having a tool holding means and an adequate machine tool for a small series or series production of workpieces, in particular, for example, for a small series or series production of straight-toothed, helical toothed, spiral toothed or circular arc toothed gears, such as, for example ring gears, pinions or bevel gears.

SUMMARY OF THE INVENTION

The above-described objects are achieved according to the invention by a method for machining a workpiece on a machine tool comprising at least 5 axes with a tool and an adequate machine tool for machining a workpiece with a tool.

A method for machining a workpiece on a machine tool comprising at least 5 axes with a tool according to the present invention is performed on a machine tool that comprises a clamping means for clamping a workpiece, in particular a clamping means fixed in a rotationally locked manner on a turntable or rotary table of the machine tool, and a work spindle including a tool holding means for holding a workpiece.

In the types of machine tools on which the invention is based (that is, e.g. 5-axes milling machines, 5-axes milling/drilling machine tools, 5-axes milling/turning machine tools and 5-axes universal milling machines and machining centers having 5 or more simultaneously drivable axes), the drive of the work or main spindle is provided for rotatively driving the tool so that the cutting movement is mainly performed by driving the tool (in contrast to the operating mode of conventional lathe types also disclosed by the prior art).

In particular, the present invention relates to methods for machining a workpiece on a machine tool and an adequate machine tool which is suitable for machining a workpiece by milling and/or drilling by using a milling or drilling tool that is clamped or held on the work spindle or main spindle of the machine tool on a tool holding means and may be driven to generate a cutting movement by means of the spindle drive. In particular, the present invention relates, for example, to 5-axes milling machines, 5-axes milling/drilling machine tools, 5-axes milling/turning machine tools and universal milling machines and machining centers having 5 or more simultaneously drivable axes.

The method according to the present invention is characterized by the following method steps:
  clamping the workpiece onto the tool holding means of the work spindle or main spindle of the machine tool,
  clamping the tool on the clamping means of the machine tool, and
  controlling the workpiece clamped on the tool holding means of the work spindle in a program-controlled manner in relation to the tool clamped in the clamping means for removing material from the workpiece.

Thus, the workpiece to be machined is clamped on the work spindle of the machine tool according to the invention by means of a tool holding means which is conventionally provided for holding the tool in order to rotatively drive the tool by using the spindle drive, in particular, to generate a cutting movement of the machining, for example, for milling or drilling machining.

Furthermore, the tool provided for machining the workpiece is clamped onto the clamping means of the machine tool instead of onto the tool holding means of the work spindle, as conventionally provided, wherein the clamping means is conventionally provided for clamping the workpiece to be machined.

Thus, the inventive clamping situation of the workpiece and the tool is reverse to a clamping situation of the tool and workpiece that is conventionally provided in the basic types of machine tools.

Therefore, this offers the advantage that a clamping situation of the workpiece and tool may be provided in which an automatic and optionally program-controlled workpiece change can efficiently be performed on a machine tool that is intrinsically adapted to insert or replace tools on the work spindle (for example, a universal milling machine or universal milling/drilling machine tool or universal milling/turning machine tool comprising a tool changer), wherein, in contrast to conventional methods, it is possible to replace or insert or even re-clamp a workpiece clamped on the work spindle during the workpiece change.

This is particularly advantageous in case of machining operations on machine tools during which the machining of a plurality of workpieces on the machine tool is provided, for example, for a small-series production or series production where a plurality of workpieces are to be machined or produced, optionally by using the same NC program. To this end, the machine tool may preferably comprise a tool changer for changing the workpieces on the work spindle (for example, on a universal milling machine) and/or a workpiece changer for changing the workpieces on the clamping means (for example, on a machining center).

In particular, a special advantage for machining operations results where a change of tool is not or at least only rarely required. Thus, when an automatic workpiece change is performed by using the tool changer (or possibly also an additional workpiece changer for changing a workpiece on the work spindle) that is preferably performed in a program-controlled manner, a plurality of workpieces may be machined in sequence on the machine tool without a required manual intervention because the workpiece change may be carried out automatically and optionally in a preferred program-controlled manner. Thus, when a plurality of workpieces is machined on the machine tool, it is possible to achieve higher efficiency due to definite time-saving and also higher precision.

Preferably, the inventive method comprises the further method step of replacing a first workpiece clamped on the tool holding means of the work spindle in a program-controlled manner with a second workpiece.

Thus, it is possible to insert or replace the workpiece on the work spindle in an automatic and program-controlled manner. Here, program-controlled means in particular that the automatic workpiece change is carried out by means of control commands of an NC program. Thus, a plurality of workpieces may be machined in sequence on the machine tool in a completely program-controlled manner, that is, particularly without a manual intervention, wherein in this case the machining of the workpieces and the workpiece change may be carried out under program control.

Preferably, the inventive method comprises the further method step of re-clamping the workpiece clamped on the tool holding means of the work spindle in a program-controlled manner, the workpiece clamped on the tool holding means of the work spindle being preferably unclamped in a program-controlled manner and preferably clamped in a program-controlled manner in a new clamping situation onto the tool holding means of the work spindle.

Thus, the workpiece clamped on the work spindle may optionally be machined first on one side and then be clamped onto the work spindle again by program-controlled re-clamping such that the workpiece may be machined first on one side in a first clamping situation and then be machined in a second clamping situation on another side after re-clamping on the work spindle. Thus, for example, the workpiece may advantageously be machined first on the front, and after re-clamping on the rear side or vice versa, first on the rear side and after re-clamping on the front.

Preferably, the machine tool comprises a tool changer which is preferably suitable to replace a tool held on the tool holding means of the work spindle in a program-controlled manner, the step of the program-controlled replacement of the first workpiece with the second workpiece being performed on the work spindle and/or the step of re-clamping the workpiece clamped in the tool holding means of the work spindle in a program-controlled manner being preferably performed by using the tool changer that is conventionally provided for a tool change on the work spindle. Such tool changers are provided, for example, in universal milling machines.

This offers the advantage that a tool changer of the machine tool, which is conventionally provided for inserting or replacing a tool on the work spindle of the machine tool, may inventively be used for the advantageous change of workpiece on the work spindle. Furthermore, it is thus also possible to optionally carry out the step of re-clamping the workpiece in a new clamping situation by using the tool changer, the tool changer for this purpose preferably being an at least double-gripper tool changer comprising at least two grippers so that the workpiece is held or unclamped from the work spindle by means of a first gripper, received by a second gripper and may be clamped again in a new clamping situation on the work spindle by means of the second gripper.

Preferably, the machine tool may also comprise a tool changer which is preferably adapted to insert or replace a workpiece clamped on the tool holding means of the work spindle in a program-controlled manner and/or to insert or replace a workpiece clamped on the clamping means of the machine tool, wherein the step of the program-controlled replacement of the first workpiece with the second workpiece on the work spindle may then be preferably performed by using the tool changer. Thus, it is possible to provide, optionally in addition to the tool changer, such workpiece changer in order to be able to insert and/or replace and/or re-clamp a workpiece on the work spindle by using the workpiece changer. Preferably, the workpiece changer is a gripper device comprising at least one gripper for gripping a workpiece.

Preferably, the workpiece changer is an at least double gripper workpiece changer comprising at least two grippers so that the workpiece may be held or unclamped from the work spindle by means of a first gripper, may be received by a second gripper and may be clamped again in a new clamping situation on the work spindle by means of the second gripper. The workpiece changer may be provided, for example, on the tool table of the machine tool.

Preferably the method according to the invention comprises the further method step of inserting and/or replacing the tool clamped on the clamping means, wherein an additional tool changer, the above-mentioned tool changer or a workpiece changer, as is used, for example, for replacing a workpiece on a clamping means for clamping workpieces in machining centers, is preferably adapted to insert and/or replace the tool clamped on the clamping means in a program-controlled manner.

Thus, it is possible to also insert or replace a tool clamped on the clamping means in a program-controlled manner. To this end, the tool changer or workpiece changer may comprise, for example, a gripper device including one or more grippers for gripping the tool held or clamped in the clamping means in a program-controlled manner. Preferably, a tool changer or workpiece changer is adapted to receive a tool on the work spindle, a tool on the clamping means and/or a tool in a tool magazine, to insert or replace a tool on the work spindle and/or the clamping means and/or to deposit a tool in a tool magazine.

Preferably, the machine tool furthermore comprises a lineup and/or a magazine which are suitable for storing workpieces or workpieces and tools, the second workpiece being preferably stored in the lineup or the magazine of the machine tool before the first workpiece is replaced with the second workpiece.

Thus, a workpiece storage is made possible on the machine tool in an advantageous manner, wherein a workpiece not used on the work spindle may be stored in the lineup or the magazine of the machine tool before and/or after it is machined on the machine tool. For machining, the workpieces on the work spindle of the machine tool may be inserted and optionally be replaced with a workpiece clamped on the work spindle.

Preferably, the workplace clamped on the work spindle is clamped in a clamping device and preferably clamped on the tool holding means of the work spindle such that the clamping device is held in the tool holding means of the work spindle. Preferably, the clamping device has a tool holding interface means for reception on the tool holding means of the work spindle, in particular a tool taper, such as, for example, a Morse taper, a steep angle taper or a hollow shank taper.

Thus, according to the invention, it is also possible to provide a clamping means as an independent subject-matter as follows:

A clamping device for clamping a workpiece on a machine tool, in particular for clamping a workpiece in a rotationally locked manner, comprising:
    a clamping means for clamping the workpiece on the clamping device in a rotationally locked manner, and
    a tool holding interface means for reception on a tool holding means of a work spindle of the machine tool, the tool holding interface means preferably having a tool taper, such as, for example, a Morse taper, a steep angle taper or a hollow shank taper.

Thus, a clamping device is provided which on the one hand makes it possible to clamp the workpiece and which on the other hand makes it possible to use the workpiece clamped in the clamping device on the work spindle by inserting or holding the clamping device in the tool holding means of the work spindle. For this purpose, the clamping device is suited, preferably in analogy to a tool holder, such as, for example, a standardized tool taper (e.g. Morse taper, steep angle taper or hollow shank taper), to be held on the tool holder of the work spindle.

If the machine tool furthermore has, for example, a tool changer and/or a workpiece changer which is suitable for inserting or replacing a tool on the work spindle and/or a tool in the clamping means of the machine tool in that a gripping means grips or holds a tool holder, such as, for example, a standardized tool taper, by means of a gripper, the clamping device is preferably suitable, in analogy to the tool holder, such as, for example, a tool taper, to be gripped or held by means of a gripper (in particular on the tool holding interface means) in order to carry out the workpiece change on the work spindle.

Preferably, the tool is a cutter head that is suitable for milling a gearing on the workpiece, in particular on the workpiece clamped on the tool holding means of the work spindle.

Thus, the method according to the invention can be performed in a particularly advantageous manner when machining or producing gearings on workpieces on the machine tool. In particular, this relates to the production of gears, for example, ring gears, pinions or bevel gears. Thus, it is possible to advantageously use the method when producing such gears in a small series production or series production in which a plurality of gears is produced in sequence on the machine tool under program control. Thus, a manual intervention is not necessary and a machined gear clamped on the work spindle can be replaced from the work spindle and another workpiece can automatically be inserted on the work spindle for manufacturing another gear on the machine tool.

To this end, the invention utilizes the circumstance that during the production of a gear from an optionally rough-machined workpiece on which a gearing is to be produced on the workpiece for manufacturing a gear a cutter head may be used for producing the gearing and it is thus not necessary to change the workplace or the cutter head during production.

Therefore, the cutter head may remain clamped in the clamping means in the inventive clamping situation for the production of gears in sequence on the machine tool and the workpieces may be inserted or replaced in sequence for machining on the work spindle in accordance with the invention. Thus, it is possible to produce a gearing on the workpiece in an efficient and program-controlled manner on 5-axis machine tools, such as, for example, 5 axes milling machines, 5-axes milling/drilling machine tools, 5-axes milling/turning machine tools and universal milling machines and machining centers having 5 or more simultaneously drivable axes by using a cutter head, as is performed, for example, according to the prior art for the so-called Gleason, Klingelnberg or Oerlikon methods, on special bevel gear milling machines or special hobbing machines.

For the production of gears by using a cutter head, for example, according to the Gleason, Klingelnberg or Oerlikon methods, special bevel gear milling machines are conventionally required on which no further machining of the workpiece is possible.

Thus, according to the present invention, it is possible for the first time in an advantageous manner to perform a gear machining, for example, according to the Gleason, Klingelnberg or Oerlikon methods, on a 5-axes machine tool, such as, for example, 5-axes milling machines, 5-axes milling/drilling machine tools, 5-axis milling/turning machine tools and universal milling machines and machining centers having 5 or more simultaneously drivable axes, by using a cutter head that may be clamped on the turntable or rotary table of the machine tool, wherein the turntable or rotary table may be further configured to be pivotably driven by means of a pivoting axis.

According to the invention, the required rotation of the cutter head according to the Gleason, Klingelnberg or Oerlikon methods may then be driven by means of a rotational axis driving the turntable or rotary table. The required rotation of the workpiece may be driven, for example, by the spindle drive of the work or main spindle. In addition, it is possible to simultaneously control the at least three linear axes for advancing movements.

Preferably, the cutter head comprises a plurality of cutting knives which are suitable for milling one or more tooth spaces of a gearing on the workplace, in particular on the workpiece clamped on the tool holding means of the work spindle.

This offers the advantage that for the production of a gearing on a workpiece, for example, when producing gears such as ring gears, pinions and bevel gears, on a program-controllable machine tool comprising at least 5 axes, e.g. on a milling/turning machine tool, on a turning/milling machine tool, a universal milling machine or a universal machining center, tooth form cutter heads may be used as tools which are known in the prior art for producing gears on special gear milling machines (e.g. special bevel gear milling machines or special hobbing machines).

Such tooth form cutter heads disclosed by the prior art comprise a rotationally symmetrical basic body for clamping on a machining spindle of a special gear milling machine. Furthermore, such tooth form cutter heads comprise knives or blades that are suitable for milling or cutting tooth spaces of a gearing on a workpiece by rotatively driving the tooth form cutter head. This makes it possible to produce tooth forms known in the prior art, in particular spur-toothed, helical-toothed, spiral-toothed or circular arc toothed gears, for example, in analogy to the Gleason, Oerlikon or Klingelnberg methods known from the prior art on conventional gear milling machines by means of a tooth form cutter head.

If such a tooth form cutter head is provided with a tool holding interface means, such as, for example, a standardized tool taper (e.g. Morse taper, steep angle taper or hollow shank taper) or connected to such a tool holding interface means in a rotationally locked manner, the tooth form cutter head may also be automatically inserted and replaced on the tool holding means of the work spindle in analogy to a normal tool, contrary to a gear milling machine known from the prior art. In this case, the workpiece may then be clamped in the clamping means of the machine tool and also be produced in accordance with the Gleason, Oerlikon or Klingelnberg methods. After that, it is possible to advantageously insert tools for finishing or fine-finishing the workpiece by an automatic tool change on the work spindle. This is not possible in the known special gear milling machines, such as, for example, special bevel gear milling machines or special hobbing machines.

Thus, a gear may advantageously be produced, for example, on a milling/turning machine tool, a turning/milling machine tool, a universal milling machine or a universal machining center, in analogy to the Gleason, Oerlikon or Klingelnberg methods known from the prior art, so that the flexibility and field of application thereof may be significantly increased. Furthermore, due to the possibility of an automatic change of tool, this offers the advantage that a gear production on the above-mentioned machine tools including fine and/or rough machining of the workpiece using further tools of the machine tools is possible.

Preferably, the relative movement between the workpiece clamped on the work spindle and the tool clamped in the clamping means is controlled by means of the at least 5 axes of the machine tool, in particular in the inventive method step of controlling the workpiece clamped on the tool holding means of the work spindle under program control in relation to the tool clamped in the clamping means for removing material from the workpiece.

Thus, in the inventive clamping situation of the tool and workpiece it is possible, in analogy to the clamping situation known from the prior art, to move the relative movement of the workpiece and tool in 5 degrees of freedom by using the at least 5 drivable axes of the machine tool. Therefore, the tool and workpiece may be controlled in relation to each other at least with the same degrees of freedom and the same flexibility that are given when the workpiece and the tool are clamped on the machine tool in a conventional manner. Preferably, the at least 5 axes of the machine tool comprise at least 3 linear axes and 2 rotational axes. This allows the control in at least 5 degrees of freedom, that is, three linear degrees of freedom and two rotational degrees of freedom. Here, the 3 linear axes are preferably arranged orthogonally.

Preferably, the clamping means is suitable for clamping the tool on a turntable of the machine tool or preferably for clamping the tool particularly in a rotationally locked manner on a turntable of the machine tool, the turntable being furthermore preferably suitable for rotatively driving the tool clamped in the clamping means. Thus, the workpiece may be clamped on the turntable of the machine tool so that a rotary movement of the clamped workpiece may be driven by using a rotational axis of the machine tool that is suitable for rotatively driving the turntable of the machine tool.

The clamping means is, for example, fixed in a rotationally locked manner on a turntable or rotary table of the machine tool, a first rotational axis being adapted to rotatively drive the turntable or rotary table. Preferably, the turntable or rotary table may be translationally moved in two or three spatial directions by means of two or three linear axes that are preferably orthogonally oriented (e.g. X and Y axes or X, Y and Z axes) and/or driven pivotably by means of one or more pivoting axes. Preferably, the work spindle is disposed on a pivotable universal milling head of the machine tool which head can be pivoted by using another rotational axis and optionally may be moved by using one or more linear axes (e.g. Z axis or Z axis and X axis and/or Y axis).

Preferably, the clamping means comprises an NC indexing head, the tool preferably being clamped to the NC indexing head and the NC indexing head preferably being suitable for rotatively driving the clamped tool. Thus, the workpiece may be clamped to an NC indexing head of the machine tool or an NC indexing head fixed to a turntable of the machine tool such that a rotational movement of the clamped workpiece is driven by means of the NC indexing head.

Preferably, the tool clamped on the clamping means is a tool device that comprises a machining means for machining the workpiece and a driving means for driving the machining means. Thus, a tool device may be clamped on the clamping means of the machine tool which comprises both a machining means, for example, a milling or drilling tool, and a driving means for driving the machining means, in particular for rotatively driving the machining means. Thus, the tool device advantageously provides a complete tool including an integrated drive and may be clamped in the clamping means of the machine tool.

Furthermore, the present invention provides a machine tool described below that is adapted to carry out the method according to the present invention, in particular, an inventive method having one or more of the features of the above-described preferred embodiments of the inventive method. As to the advantages of a machine tool according to the present invention, reference is made to the advantages described above with respect to the inventive method.

A machine tool, in particular a universal milling machine or machining center, for machining a workpiece with a tool under program control, in particular by using control data or an NC program, according to the present invention comprises a clamping means for clamping a workpiece, a work spindle including a tool holding means for holding a tool and at least 5 axes. The machine tool according to the present invention is characterized in that the tool holding means of the work spindle is adapted such that the workpiece on will be clamped on the tool holding means and, respectively, that the workpiece is clamped on the tool holding means, the clamping means is adapted such that the tool will be clamped on the clamping means and, respectively, that the tool is clamped on the clamping means, and the machine tool is adapted to control the workpiece clamped on the tool holding means of the work spindle in relation to the tool clamped on the clamping means for removing material from the workpiece in a program-controlled manner. In particular, the machine tool of the present invention is preferably adapted to carry out at least one of the above-described methods.

Preferably, the machine tool is adapted to replace a first workpiece clamped on the tool holding means of the work spindle with a second workpiece in a program-controlled manner.

Preferably, the machine tool is adapted to re-clamp the workpiece clamped on the tool holding means of the work spindle in a program-controlled manner, the workpiece clamped on the tool holding means of the work spindle being preferably unclamped in a program-controlled manner and preferably clamped in a new clamping situation on the tool holding means of the work spindle in a program-controlled manner.

Preferably, the machine tool comprises a tool changer which is suitable for replacing a tool held on the tool holding means of the work spindle in a program-controlled manner, the tool changer preferably being further suitable for replacing the first workpiece with the second workpiece on the work spindle in a program-controlled manner and/or to re-clamp the workpiece clamped in the tool holding means of the work spindle in a program-controlled manner.

Preferably, the tool changer further is suitable for inserting and/or replacing a tool clamped on the clamping means in a program-controlled manner.

Preferably, the machine tool comprises a tool changer that is suitable for replacing a workpiece clamped on the tool holding means of the work spindle in a program-controlled manner, the tool changer furthermore being preferably suited to replace the first workpiece with the second workpiece on the work spindle in a program-controlled manner and/or to re-clamp the workpiece clamped on the tool holding means of the work spindle in a program-controlled manner.

Preferably, the machine tool comprises a lineup and/or a magazine which are adapted to store workpieces or workpieces and tools, the second workpiece preferably being stored in the lineup or the magazine of the machine tool before the first workpiece is replaced with the second workpiece.

Preferably, the tool holding means of the work spindle is suited to hold a clamping device, the workpiece preferably being clamped on the clamping device and preferably clamped on the tool holding means of the work spindle such that the clamping device is held on the tool holding means of the work spindle. Preferably, the clamping device comprises a tool holding interface means, such as, for example, a tool taper (e.g. Morse taper, steep angle taper or hollow shank taper) for reception in the tool holding means of the work spindle.

Preferably, the relative movement between the workpiece clamped on the work spindle and the tool clamped on the clamping means is controlled by means of the at least 5 axes of the machine tool. Preferably, the at least 5 axes of the machine tool comprise at least 3 linear axes and 2 rotational axes.

Preferably, the clamping means is suitable for clamping the tool on a turntable of the machine tool or preferably clamping the tool in a rotationally locked manner on a turntable of the machine tool, the turntable being suitable for rotatively driving the tool clamped in the clamping means.

Preferably, the clamping means comprises an NC indexing head, the tool preferably being clamped to the NC indexing head and the NC indexing head preferably being suitable for rotatively driving the clamped tool.

Preferably, the tool clamped in the clamping means is a tool device that comprises machining means for machining the workpiece and driving means for driving the machining means.

BRIEF DESCRIPTION OF THE DRAWINGS

FIG. 1 shows an exemplary schematic illustration of an embodiment of a machine tool for machining a workpiece according to the present invention.

DETAILED DESCRIPTION OF THE DRAWINGS AND PREFERRED EMBODIMENTS OF THE PRESENT INVENTION

Below, the present invention will be described and explained in detail by means of a preferred embodiment of a machine tool for machining a workpiece and a method according to the present invention by using an exemplary schematic illustration.

FIG. 1 shows an exemplary, schematic illustration of a preferred embodiment of a machine tool 100 for machining a workpiece 300 according to the present invention, which is adapted to carry out a method according to a preferred embodiment of the present invention. In particular, a preferred embodiment of a method of the present invention will be described below in which gears, such as, for example, ring gears, pinions or bevel gears, are produced on a machine tool comprising 5 axes by using a tooth form cutter head. However, the present invention is not limited to producing gears by means of a tooth form cutter head but is particularly suitable for sequentially machining a plurality of workpieces on a machine tool where only one tool or at least only a few tools are necessary for machining the individual workpieces.

The machine tool comprises a work spindle 110 including a tool holding means 111 which is suitable for holding or clamping a tool. To this end, the tool holding means 111 of the work spindle 110 is suitable for holding a tool in that a standardized tool holder, for example, a standardized tool taper, such as, for example, the known tool taper embodiments of a Morse taper, steep angle taper or hollow shank taper, may be held and locked in the tool holding means 111. The work spindle 110 of the machine tool 100 is suitable for rotatively driving a tool held in the tool holding means 111, for example, milling and/or drilling tools or other tools, for generating a cutting movement in order to remove material from a workpiece in a machining process.

Furthermore, the machine tool 100 comprises a clamping means 120 which is suitable for clamping a workpiece to be machined on the machine tool 100. FIG. 1 exemplarily shows that the clamping means 120 is fixed in a rotationally locked manner on a turntable 130 of the machine tool 100. By rotatively driving the turntable 130 it is possible to rotatively drive a workpiece clamped in the clamping means 120 because the clamping means 120 is fixed in a rotationally locked manner to the turntable 130. However, the present invention is not limited to such clamping means 120 which are fixed in a rotationally locked manner to a turntable 130 of the machine tool 100. Rather, an inventive clamping means in another embodiment of the present invention may comprise an NC indexing head which is suitable for rotatively driving a workplace clamped in the NC indexing head. Such NC indexing head may furthermore be fixed in a rotationally locked manner to a turntable 130 of the machine tool 100. Moreover, embodiments are possible in which the tool is a complete tool device that, in addition to the machining means of the tool, such as, for example, a milling cutter or a drill, may comprise a driving means for rotatively driving the machining means.

According to this embodiment, the machine tool comprises three simultaneously drivable orthogonal linear axes and two simultaneously drivable rotational axes in order to control a workplace clamped in the clamping means 120 in relation to a tool clamped or held on the work spindle 110 in three linear and two rotational degrees of freedom in a program-controlled manner, for example, by using an NC program. Thus, any relative position and posture of the workpiece and the tool towards each other can be moved toward or driven. In this case, one of the rotational axes of the machine tool according to the present embodiment is suitable, for example, for rotatively driving the turntable 130 of the machine tool 100. At least one other rotational axis (not shown) is suitable, for example, for aligning the spatial angular orientation of the work spindle 110, as is known, for example, from machine tools comprising a pivotable universal milling head. It is possible, for example, to move the position of the work spindle 110 and/or the turntable 130 in the three spatial directions by using the three or more orthogonal linear axes (not shown). In another embodiment, the position of the work spindle may be moved by using at least two linear axes and the position of the turntable may be moved by using at least a third linear axis so that the relative position of a workpiece to a tool may again be driven in three spatial degrees of freedom. In a further embodiment, the position of the work spindle may be moved by using at least one linear axis and the position of the turntable may be moved by using at least two further linear axes so that the relative position of a workpiece to a tool can again be driven in three spatial degrees of freedom as well.

The machine tool may be in the form of a 5-axis milling machine tool, 5-axis milling/drilling machine tool, 5-axis milling/turning machine tool, 5-axis universal milling machine or 5-axis machining center. 6-axis milling machine tools, 6-axis milling/drilling machine tools, 6-axis milling/turning machine tool, 6-axis universal milling machines or 6-axis machining centers or embodiments comprising more than 6 axes are also conceivable. The machine tool 100 may, for example, be in the form of a monobloc machine tool in a monobloc constructional style (as shown in the embodiment according to FIG. 1), as a portal machine tool in a portal constructional style, as a gantry machine tool in a gantry constructional style, as compact portal bed machine, as a horizontal machining center or also as a vertical machining center.

Furthermore, the machine tool 100 shown in FIG. 1 comprises a tool changer 140 that is suitable for inserting or replacing a tool on the work spindle 110 in an automatic and program-controlled manner. This means that it is a universal milling machine because a tool changer is provided. Embodiments in which a workpiece changer is additionally provided for replacing workpieces on the clamping means 120 on the turntable 130 are referred to as a machining center.

According to the present embodiment, the tool changer 140 comprises a gripper device 141 including a gripper 142 in order to automatically insert or replace a tool held in the tool holding means 111 of the work spindle 110. For this purpose, the gripper device 141 is suitable for holding a tool by using the gripper 142 in that e.g. a tool holding interface means or a standardized tool taper (e.g. Morse taper, steep angle taper or hollow shank taper) in which the tool is held is held or gripped by the gripper 142. Thus, the tool changer 140 according to this embodiment of the present invention corresponds to a so-called single gripper tool changer.

However, the present invention is not limited to machine tools including such single gripper tool changers. Rather, it is also possible to provide embodiments of the present invention that comprise other tool changing means, for example, having so-called double gripper tool changers, or tool changing means that function according to the so-called pick-up or pick-and-place mechanism wherein a tool can be inserted or replaced from the work spindle of the machine tool directly into a tool magazine and vice versa.

Furthermore, it is possible to provide embodiments of the present invention in which the tool changer is a single, double or multiple gripper tool changer which is moreover suitable for inserting or replacing a tool clamped in the clamping means 120, for example, replacing it also from the work spindle 110 and inserting it into the clamping means 120 or replacing it from the clamping means 120 and inserting it into the work spindle 110 and/or removing it from a tool magazine and placing it into a tool magazine.

Additionally, embodiments of the present invention are possible in which the machine tool is adapted to re-clamp the workpiece clamped in the tool holding means of the work spindle in a program-controlled manner, the workpiece clamped in the tool holding means of the work spindle being preferably unclamped in a program-controlled manner and preferably clamped in a program-controlled manner in a new clamping situation in the tool holding means of the work spindle. Due to the tool changer, this may optionally also be suitable for carrying out the re-clamping of the workpiece clamped on the work spindle. For this purpose, the tool changer may, for example, be a double gripper tool changer system in which a first gripper holds or unclamps the workpiece from the work spindle, a second gripper receives the workpiece from the first gripper and then clamps in onto the work spindle in a new clamping situation, Thus, a workpiece may be re-clamped on the work spindle in order to be subjected, for example, first to a front and then to a rear side machining or vice versa.

According to the above-described embodiments of the present invention, the tool changer 140 is furthermore adapted, apart from performing a change of tool, to insert or unclamp the workplaces on the work spindle. However, for changing the workpieces the machine tool may also comprise an especially provided workpiece changer, optionally provided on the tool table, which is suitable for inserting or replacing a workpiece on the work spindle 110 and/or in the clamping means 120 in a program-controlled manner, optionally also for re-clamping it on the work spindle. Such workpiece changer may for example be formed as a gripper means including one or more grippers for gripping a workpiece, optionally in analogy to the above-described tool changers.

Further embodiments of the present invention are possible in which the tool 200 clamped in the clamping means 120 is a tool device comprising both a machining means for machining a workpiece, such as, for example, a milling or drilling tool, and a driving means for driving the machining means, for example, for rotatively driving the machining means, for example, the milling or drilling tool. Thus, for example, it is possible to clamp complete tools including an integrated tool drive in the clamping means 120 of the machine tool 100.

In contrast to the method for machining a workpiece on a machine tool known from the prior art, the clamping situation of the workpiece and tool is reverse according to the invention. This inventive clamping situation is shown in FIG. 1.

A workplace 300 is clamped on a work spindle 110 which according to the prior art is conventionally provided for holding a tool, the tool 200 being inventively clamped in the clamping means 120 of the machine tool 100 that is provided according to the prior art for clamping a workpiece to be machined.

Particularly, according to this embodiment of the present invention, the workpiece 300 is held in the work spindle 110 such that it is clamped in a clamping device 400, as schematically shown in FIG. 1. The clamping device 400 is held in the tool holding means 111 of the work spindle 110. To this end, according to this embodiment of the present invention, a front of the clamping device including a tool holding interface means is provided in the form of a front of a standardized tool taper (e.g. Morse taper, steep angle taper or hollow shank taper) or in the form of a standardized tool taper (e.g. Morse taper, steep angle taper or hollow shank taper) which makes it possible to hold or clamp the clamping device 400 in analogy to a standardized tool taper on the work spindle 110 on the tool holding means 111.

Furthermore, the clamping device 400 according to this embodiment of the present invention is suited to be received by the gripper 142 of the gripper device 141 of the tool changer 140 so that the workpiece 300 clamped on the work spindle 110 can be inserted or replaced by using the tool changer 140 on the work spindle 110.

As a tool for machining the workpiece 300 according to this embodiment of the present invention, a tooth form cutter head is clamped on the clamping means 120 of the machine tool 100, which comprises a rotationally symmetrical basic body 200 and a plurality of cutting knives 201 arranged on the basic body 200, the cutting knives 201 being suitable for milling a tooth space of a gearing on the workpiece 300. Such tooth form cutter heads are disclosed by the prior art for producing gears and conventionally used on special gear milling machines (in particular special bevel gear milling machines or special gear hobbing machines) for producing gears, for example, according to the Gleason, Oerlikon or Klingelnberg methods known from the prior art.

According to this embodiment of the present invention, the workpiece 300 clamped on the work spindle is e.g. a roughly machined workpiece 300 which, as exemplarily shown in FIG. 1, is already shaped in the form of a basic body of a bevel gear. In order to produce a bevel gear having a gearing from the workpiece 300, the workpiece 300 clamped on the work spindle and the tooth form cutter head 200; 201 clamped in the clamping means 120 of the machine tool 100 are controlled in relation to each other in a program-controlled manner by using the five axes of the machine tool 100 in order to carve out a gearing on the workpiece 300 by machining using the cutting knives 201.

Furthermore, the machine tool 100 comprises a magazine 150 including a plurality of cases 151, 152 and 153 for storing or receiving tools or workpieces. Exemplarily, the workpieces 301 and 302 are stored in the cases 151 and 152, respectively. No workpiece is stored in case 153. According to the invention, the workpiece 300 clamped on the work spindle 110 may now be replaced by using the tool changer 140 with one of the workpieces 301 and 302 in an automatic and program-controlled manner. For this purpose, the workpiece 300 clamped on the work spindle 110 is removed from the tool holding means 111 of the work spindle 110 by means of the gripper device 141 in that the gripper 142 takes or grips the clamping means 400 in analogy to receiving a tool taper by the gripper 142 in a conventional automatic tool change.

The workpiece 300 held by the gripper 142 is inserted into the free case 153 by the gripper device 141 of the tool changer 140 to be stored there. Then the gripper 142 can remove one of the workpieces 301 and 302 from the magazine 150 in order to insert it on the work spindle 110 in an automatic and program-controlled manner. To this end, the workpieces 301 and 302 are stored in cases of the magazine 150, optionally already clamped in clamping devices in analogy to the clamping situation of the workpiece 300 in the clamping device 400 so that the gripper 142 may receive the clamping devices in analogy to the clamping device 400 for removing the workpieces 301 and 302 from the magazine 150.

Thus, an automatic change of workpiece may be carried out on the machine tool 100 in which the workpiece 300 clamped on the work spindle 110 is replaced with another workpiece 301 or 302 so that the inserted workpiece 301 or 302 can be machined on the machine tool 100 with the tool 200; 201 clamped in the clamping means 120.

The present invention thus provides a clamping situation of a workpiece and tool in which an automatic and optionally program-controlled change of workpiece can be performed on a machine tool that is suitable for inserting or replacing tools on the work spindle, wherein during the workpiece change a workpiece clamped on the work spindle may be replaced or inserted in contrast to conventional methods. This is particularly of advantage in machining operations on machine tools in which the machining of a plurality of workpieces on the machine tool is provided, for example, for a small series production or series production in which a plurality of workpieces is to be machined or produced, optionally by using the same NC program.

Thus, according to the present invention a plurality of workpieces, for example gears, may be machined or produced in sequence on the machine tool without a required manual intervention because the change of workpiece can be carried out in an automatic, optionally program-controlled, manner. Thus, when a plurality of workpieces is machined on the machine tool, for example when gears are produced, higher efficiency, distinct saving of time and even higher precision can be achieved.

The present invention is not limited to the above-described exemplary embodiments. Rather, embodiments of the present invention are moreover possible that combine features of the above-described embodiments of the present invention.

The invention claimed is:

1. A method for producing gearings on a workpiece at a numerically controlled machine tool using a tooth form cutter head, the numerically controlled machine tool comprising:
a work spindle having a holder interface configured to receive a tool holder that is configured to fixedly hold a milling cutter, the work spindle being configured to drive a rotation of the tool holder received at the holder interface of the work spindle by means of a spindle motor, the work spindle also being configured to receive the workpiece;
a workpiece clamp;
at least three linear-axis drives and in addition to the spindle motor associated with the rotation driven by the work spindle, at least two rotation-axis drives, the at least three linear-axis drives and the at least two rotation-axis drives being configured to control a relative movement of the workpiece clamp with respect to the work spindle along at least three linear axes and about at least two rotation axes;
a rotatable turntable, configured to be rotated by being driven by one of the at east two rotation-axis drives, the workpiece damp being mounted on the rotatable turntable; and
a tool changer which is configured to replace the tool holder, when the tool holder is received at the holder interface of the work spindle, replacement of the workpiece, as a first workpiece, received at the work spindle with a second workpiece being performed by using the tool changer, the method comprising:
using the tool changer to perform at least one of:
(i) replacing the tool holder, which is clamped at the holder interface of the work spindle, with the first workpiece, and clamping the first workpiece at a clamping device, which is held at the holder interface of the work spindle,
(ii) replacing the first workpiece, which is clamped at the clamping device which is held at the holder interface of the work spindle, with the tool holder, and clamping the tool holder at the holder interface of the work spindle, and
(iii) placing the first workpiece at the work spindle, if the tool holder has been previously removed from the holder interface of the work spindle, and clamping the first workpiece at the damping device, which is held at the holder interface of the work spindle:
clamping the tooth form cutter head to the workpiece clamp on the turntable, the tooth form cutter head having a plurality of knives or blades that are suitable for milling one or more tooth spaces of a gearing on the first workpiece; and
controlling, based on a numerical control program and driven by the at least three linear-axis drives and the at least two rotation-axis drives, a relative movement of the first workpiece clamped at the clamping device, which is held at the holder interface of the work spindle, with respect to the tooth form cutter head clamped at the workpiece clamp on the turntable.

2. The method of claim 1, further comprising:
replacing the first workpiece clamped at the clamping device, which is held at the holder interface of the work spindle, with the second-workpiece.

3. The method of claim 1, wherein the clamping device has a tool holding interface configured to be received in the holder interface of the work spindle.

4. The method of claim 1, wherein the workpiece clamp is fixed in a rotationally locked manner on the turntable of the machine tool so as to rotate together with the turntable.

* * * * *